United States Patent [19]

Reinsch

[11] 4,051,892
[45] Oct. 4, 1977

[54] HEAT DISSIPATION SYSTEM

[76] Inventor: Arnold Otto Winfried Reinsch, 13170 Carousel Lane, Del Mar, Calif. 92014

[21] Appl. No.: 533,287

[22] Filed: Dec. 16, 1974

[51] Int. Cl.² .......................... F28D 15/00; G21C 9/00
[52] U.S. Cl. ..................................... 165/107; 165/134; 176/37; 176/38; 176/60
[58] Field of Search .......................... 176/37, 38, 65, 61, 176/56, 60, 87; 122/32, 33

[56] References Cited
U.S. PATENT DOCUMENTS

| | | | |
|---|---|---|---|
| 3,103,917 | 9/1963 | Bauer et al. | 122/33 |
| 3,818,935 | 6/1974 | Karker et al. | 176/87 |

*Primary Examiner*—Verlin R. Pendegrass
*Assistant Examiner*—Ralph Palo
*Attorney, Agent, or Firm*—Brown & Martin

[57] ABSTRACT

A heat dissipation system for removing the decay heat from a nuclear reactor after a failure in the main coolant system. The heat dissipation system provides a fluid circulation conduit in which a condensible fluid is circulated. Heat removed from the circulating fluid is utilized to vaporize condensate and thereby power a jet circulator that provides the motive force for continued fluid circulation. A heat exchanger in the fluid circulation conduit removes and rejects heat from the circulating fluid to continuously remove and reject heat from the system.

5 Claims, 3 Drawing Figures

HEAT DISSIPATION SYSTEM

BACKGROUND OF THE INVENTION

In order to attain an acceptable level of safety in the operation of a nuclear power plant or similar installation incorporating a nuclear reactor, it is necessary to provide an emergency core cooling system (ECCS). The principle function of the ECCS is to dissipate the decay heat in the core after the reactor is shut down if there is a failure in the main coolant system. Such action is necessary because the core of the reactor continues to produce heat, known as decay heat, even after the removal of the moderator makes the core subcritical. The decay heat is sufficient to produce temperatures that ultimately would melt the cladding and the fuel and destroy the integrity of the pressure vessel. High temperatures also create substantial quantities of free hydrogen with the resultant possibility of a catastrophic explosion.

A conventional safety system frequently utilized in water-cooled reactors incorporates sufficient pumping capacity to pump larger quantities of cooling water into the reactor vessel with sufficient excess capacity to compensate for leakage through a break in the main coolant system.

The use of cooling water has numerous disadvantages for which there has been no effective solution. A back-up system for shutting down the reactor must be provided because the water acts as a moderator making the core critical. In some cases, a borated solution is used for this purpose. The system must move large quantities of water very quickly after it is activated and therefore numerous relatively vulnerable components must function properly and in sequence for the system to be effective. For example, the power required to drive the pumps must be provided by an auxiliary generator. Normally, Diesel generators are utilized for this purpose. Therefore, the Diesel engines must first be started before pumping can commence. The starting of Diesel engines requires significant time and is not fool-proof. After engine starting, the pumps for the cooling water must be brought up to speed. Since there are relatively large rotating masses involved, this requires significant time. During the time that the machinery is being put on line, the core is increasing in temperature. The temperatures may be so great that fuel rod swelling and other deformation of the core may have taken place which reduces the penetration of the water and thereby reduces its capacity to provide sufficient cooling. In addition, the high temperatures flash much of the initial water into steam creating a back pressure that prevents further penetration of the water through the core. Since the increase in temperature in the core reduces the ability of the water to cool, an unstable situation is created which is undesirable in a safety system. Further, the quenching action of the water on embrittled fuel rods at elevated temperature may cause ultimate structural failure of those critical elements. Finally, an elaborate control system must be provided to maintain the operational stability of the system during the emergency cooling action.

Therefore, it is desirable to have an emergency core cooling system with enhanced reliability.

SUMMARY OF THE INVENTION

An exemplary embodiment of the invention will be described in association with a system for dissipating heat from a water-cooled nuclear reactor. It is specifically contemplated that the invention also has applicability to gas-cooled reactors and an embodiment of the system for that purpose is described hereinafter. It is also contemplated that the invention has application to heat dissipation requirements for any system having a contained heat source wherein it is necessary to reject heat from the system and high-efficiency is not a requirement. For example, which is not intended as limiting, is the use of the system to reject decay heat from radioactive wastes that have been removed from a nuclear reactor.

The invention overcomes the deficiencies of prior art devices by a new combination of components. A jet circulator is incorporated in the system. The use of such a circulator for powering a heat rejection operation has not been considered practicable because such devices have relatively low efficiency. The instant invention includes the recognition that there is an abundant energy source which makes the use of a low-efficiency device practical. That is, the source of heat for which heat rejection is necessary is utilized as a source of the energy to circulate the coolant fluid. In a specific application of these principles, in the exemplary embodiment of the invention, a jet circulator is utilized to circulate steam in a normally water-cooled reactor. Propellant steam is generated from condensate at an elevated pressure, and delivered to the motive fluid inlet of the jet circulator. The propellant steam and circulated coolant fluid (also steam in the exemplary embodiment) mix in the jet circulator and produce a combined coolant fluid flow in a fluid circulation conduit. The system is designed for operation under the least favorable combination of failures in the main coolant system and specifically is configured to provide sufficient cooling with a break in that portion of the main coolant system that also forms a part of the fluid circulation conduit.

The basic criterion for sensing failure of the main coolant system is a loss of pressure. Such a pressure loss triggers the closing of valves. The valves isolate the main coolant system and connect the heat dissipation system. The fluid flow conduit includes portions of the main coolant piping, the pressure vessel, and separate piping, providing a continuous circulation path through the system. After the coolant fluid (steam) passes through the core and removes heat therefrom, becoming elevated in temperature, it passes to the vaporizer (steam generator) where the heat necessary to generate the propellant steam is removed. This heat is later returned to the flow, so that the only heat rejection from the system takes place after the vaporizer in a heat exchanger (condenser). The heat exchanger may be of the tube-type which provides for a continuous flow of cooling water to remove heat from the fluid coolant and discharge the heated cooling water into a body of water. The heat exchanger may also be any other suitable heat exchanger type that is capable of removing sufficient capacity to lower the temperature of the coolant fluid sufficiently to obtain partial condensation of the steam. The condensed fraction is then pumped, at an elevated pressure, to the vaporizer. The remaining fluid coolant then passes through the jet circulator. The circulator raises the pressure and thereby maintains circulation in the fluid flow conduit, by the motive force from the propellant steam generated by the vaporizer.

In applications of the principles of the invention to a gas-cooled reactor such as a helium-cooled reactor, for example, the coolant fluid in steady-state operation would be mixture of helium and steam, or other condensible gas. The gas-cooled reactor may be sensitive to excessive wetness in the coolant fluid and for this reason the jet circulator is located between the vaporizer and condenser. In this configuration, the condenser removes sufficient moisture reducing damage to the reactor core.

As used herein, in term jet circulator includes any device wherein a pressurized fluid is intermixed with and induces flow in a second fluid that is at a lower pressure.

It is therefore an object of the invention to provide a new and improved heat dissipation system.

It is another object of the invention to provide a new and improved heat dissipation system that is useful in emergency core cooling of nuclear reactors.

It is another object of the invention to provide a new and improved heat dissipation system that is powered from the source of heat being cooled.

It is another object of the invention to provide a new and improved heat dissipation system that incorporates passive components thereby increasing reliability.

It is another object of the invention to provide a new and improved heat dissipation system that has a reduced start-up time.

It is another object of the invention to provide a new and improved heat dissipation system that maintains a reactor core in the subcritical state during operation.

It is another object of the invention to provide a new and improved heat dissipation system that is applicable to emergency core cooling of gas-cooled and water-cooled reactors.

It is another object of the invention to provide a new and improved heat dissipation system that provides for the removal of undesirable gases.

It is another object of the invention to provide a new and improved heat dissipation system that does not utilize any large rotating machinery.

It is another object of the invention to provide a new and improved heat dissipation system that is not susceptible to water slug impact damage.

Other objects and many attendant advantages of the invention will become more apparent upon a reading of the following detailed description together with the drawings in which like reference numerals refer to like parts throughout and in which:

DETAILED DESCRIPTION OF THE DRAWINGS

Figure 1:
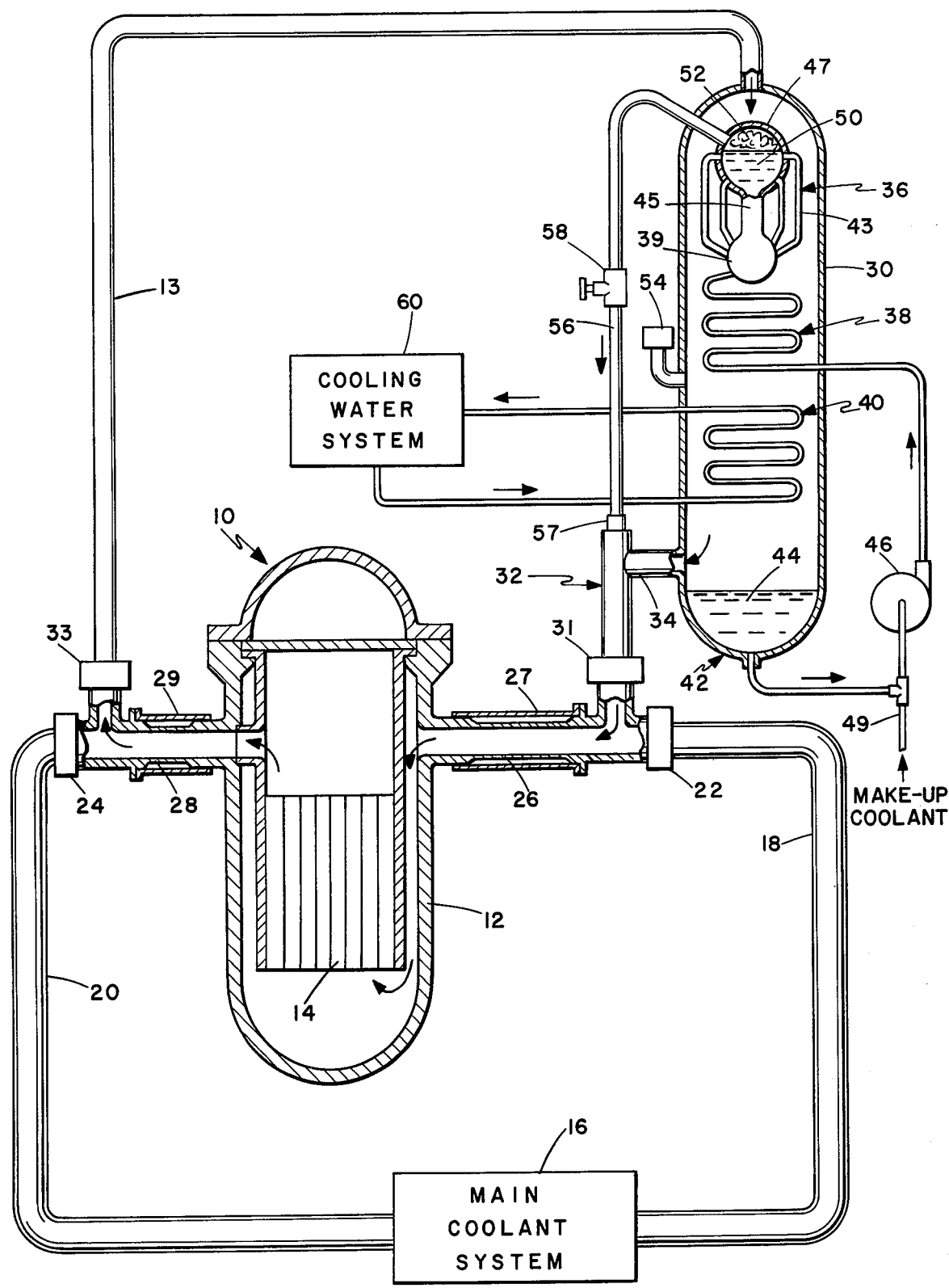
FIG. 1 is a diagram, with portions in section, of a nuclear reactor incorporating the heat dissipation system according to the invention.

Now to FIG. 1, there is illustrated the heat dissipation system according to the invention in its use as an emergency core cooling system for a water cooled reactor 10. The reactor 10 includes a pressure vessel 12 with a core 14. A main coolant system 16 is connected to the pressure vessel 12 by main coolant piping 18 and 20. Two isolation valves 22 and 24 are located at the inlet and discharge portions of the main coolant system to isolate the main coolant system from the pressure vessel in case of failure of the main coolant system. A section 26 of the main coolant piping 18 and a section 28 of the main coolant piping 20 is positioned between the isolation valves 22 and 24 and the pressure vessel 12. These sections are therefore common to the main coolant system and the heat dissipation system as will be more fully described hereinafter.

A fluid circulation pipe 13 connects between the discharge side of the pressure vessel 12 and a heat transfer vessel 30. Coolant fluid flow from the heat transfer vessel is drawn into a jet circulator 32 through a coolant fluid inlet 34 and is forced into the intake of the pressure vessel 12.

The heat transfer vessel 30 houses a vaporizer 36, an economizer 38, heat rejection means 40, and a condensate collection section 42. The condensed fraction 44 of the coolant fluid flow is pumped from the condensate collection section 42, by a feed water pump 46, through the economizer 38, and into the evaporator 36. Make-up coolant to compensate for leakage or other loss is added, as required, from pipe 49.

The evaporator 36 is a steam generator in the form of a boiler. The boiler 36 has a lower liquid reservoir 39, up-flow tubes 43, a down-comer 45 and a steam dome 47. The use of a boiler 36 instead of a continuous tube steam generator is especially advantageous in the system of the invention in that the boiler 36 provides a positive separation of the water 50 and steam 52 in the steam dome 47. This gas-liquid interface separates contamination products that may be released due to high temperatures in the reactor core 14 and prevents them from being recirculated in the system by the action of the jet circulator 32. The boiler 36 is also self-regulating over a wide range of in-flow heat rates, in that an equilibrium between steam and water is automatically maintained. With higherin-flow rates more steam is generated, more differential pressure is created by the jet circulator 32, and additional cooling is developed as will be described more fully hereinafter. Thus, the boiler 36 further contributes to the over-all stability of the system in operation.

The boiler steam pressure can be controlled by valve 58 or by the output pressure of the feed water pump 46. Since the pump is working with the liquid phase of the steam-water fluid coolant circulating in the system the pressure rise is obtained with relatively little energy input. To eliminate the need for outside power source, the pump 46 may be driven by a steam turbine powered from steam in steam dome 47.

The maximum pressure in the system is determined by a safety valve 54. The safety valve 54 is placed downstream of the evaporator 36 so that in the event of any system failure that would cause pressure to rise above the release pressure of safety valve 54, coolant fluid will still circulate past the vaporizer generating the propellant steam and maintaining coolant flow to the reactor. The propellant steam from the vaporizer 36 is led to the jet circulator 32 through a conduit 56 and control valve 58. Conduit 56 terminates in the motive fluid input 57 of the jet circulator 32.

The heat rejection means 40 is located down-stream of the vaporizer 36 and economizer 38. The heat rejection means 40 removes heat from the coolant fluid circulating in the fluid circulation conduit and rejects the heat to the exterior of the system through a cooling water system 60. The heat rejection means 40 may be of the continuous flow tube-type as illustrated or any type of heat exchanger suitable for removing sufficient heat from the coolant fluid to partially condense the condensible fluid circulating in the fluid circulation conduit. In the exemplary embodiment, the condensible fluid and the coolant fluid are the same, i.e. water-water vapor. Therefore, the heat rejection means 40 need only remove a sufficient quantity of heat to partially condense the water vapor, circulating in the form of steam, thereby providing a condensed fraction 44 of the water vapor to provide feed water for the boiler 36.

The sections 26 and 28 are surrounded by flow restrictions 27 and 29 respectively.

Figure 3:
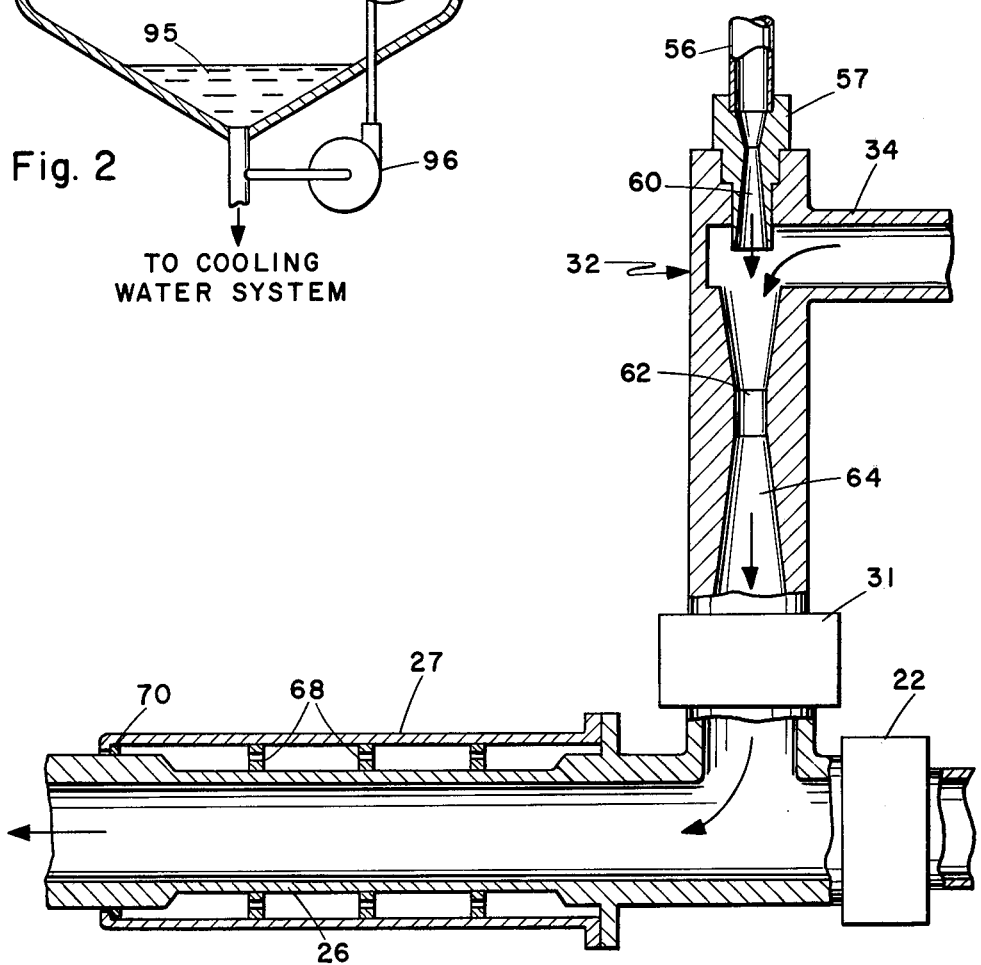
FIG. 3 is an enlarged sectional view of the jet circulator and its coupling to the reactor as in FIG. 1.

Referring now to FIG. 3, the detailed configuration of the jet circulator 32 is illustrated. The steam in conduit 56 is delivered through the motive fluid inlet 57 that includes a nozzle section 60. The nozzle 60 raises the propellant steam to a high velocity and injects it into a mixing chamber 62. Part of the momentum of the propellant steam is transferred to the coolant fluid supplied through the coolant fluid inlet 34. The combined flow then passes through a diffuser section 64 which increases the pressure of the coolant fluid to provide a positive circulation into the pressure vessel 12.

FIG. 3 also illustrates the flow restrictor 27 that surrounds the section 26 of the main coolant pipe 18 and comprises a pressure retaining means. The section 26 comprises a portion of the fluid circulation conduit and therefore is important to the integrity of the heat dissipation system, according to the invention. The effect of the pressure retaining means is to limit the flow rate which can be produced by any break in the fluid pipe 26. Flow through a break in the pipe 26 is forced to travel from right to left past a plurality of barriers 68 and through a constricted passage 70 at the end of the flow restrictor 27. Thus, the flow restrictor 27 insures that sufficient pressure will be retained in the system to maintain an adequate flow of coolant fluid as propelled by the jet circulation 32.

The flow restrictor 29 illustrated in FIG. 1 is of similar construction to flow restrictor 27 and performs the same functions with respect to the section 28 of the main coolant pipe 20.

Referring again to FIG. 1, the fluid circulation conduit comprises the fluid circulation pipe 13, the heat transfer vessel 30, the coolant fluid inlet 34, the combined flow section of the jet circulator 32, the section 26 of the main coolant pipe 18, the reactor vessel 12 and the section 28 of the main coolant pipe 20. Thus, the heat rejection system is designed to operate as a closed system with only limited losses past the flow restrictors or safety valves. Accordingly, any gases released from the reactor core by high temperatures will be confined to flow with the main coolant fluid and may be removed by suitable means (not shown) in the heat transfer vessel. For example, hydrogen generated by metal-water reaction in the reactor core may be removed by a supplemental condenser which completely condenses a portion of the fluid circulating in the system. This condensation results in the removal of most of the water from the portion of the circulated fluid so that any fluid remaining in the gaseous state is therefore an undesirable gas such as hydrogen. The gas may be discharged into a suitable storage container.

Figure 2:
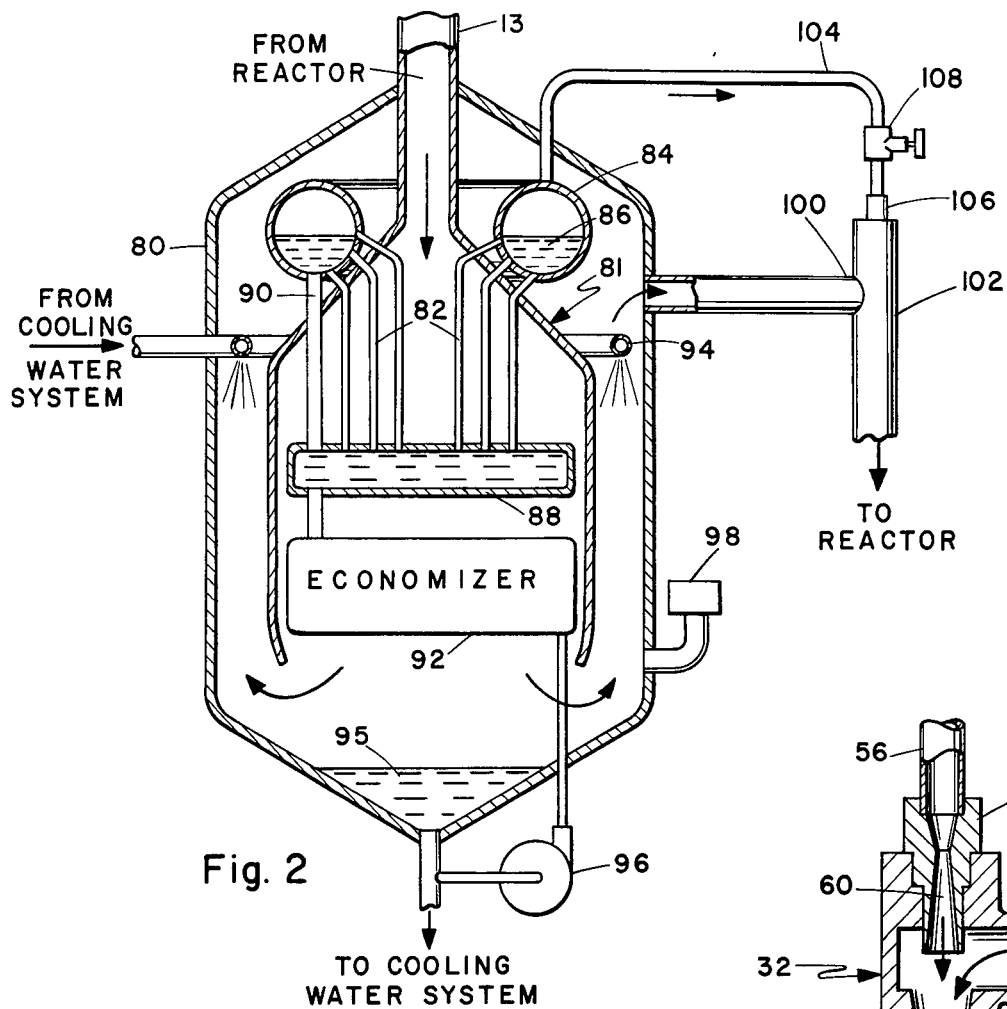
FIG. 2 is a diagram of an alternative steam generator and condenser configuration.

Referring now to FIG. 2, an alternative configuration for the boiler and heat rejection means is illustrated. The boiler and heat rejection means are contained in a heat transfer vessel 80 which is connected to the fluid circulation pipe 13. Coolant fluid in the fluid circulation pipe passes over a plurality of upriser tubes 82 which deliver the resultant steam to a steam drum 84. The steam drum 84 has a steam-water interface. Excess water 86 is returned to the supply tube 88 by downcomer 90. After passing through the evaporator 81, the coolant fluid passes over the economizer 92 and undergoes a reversal in direction, passing vertically up through a condensing spray from a condensing spray manifold 94. Sufficient water is delivered from the condensing spray manifold 94 to at least partially condense the coolant fluid resulting in a condensed fraction of the fluid together with the cooling water spray 95 being collected at the bottom of the heat transfer vessel 80. A portion of the condensed liquid is returned, via feed water pump 96, through the economizer and boiler 81. The remainder of the condensed fluid and cooling water is delivered to the cooling water system (not shown) where the heat is rejected by any suitable means.

A safety valve 98 performs the functions described with respect to safety valve 54.

The coolant fluid enters a coolant fluid inlet 100 of a jet circulator 102 where it is mixed and propelled by propellant steam in propellant steam line 104. The propellant steam line 104 is connected to the motive fluid inlet 106 of the jet circulator 102 through a control valve 108.

It will be understood that the invention has been described in association with a main coolant system illustrated with a single coolant loop. However, the invention is applicable to any number of main coolant system loops such as the three or four coolant system loops found in conventional nuclear reactors. In such multiple loop applications, the heat rejection system is incorporated in each cooling loop creating a redundancy which further increases the reliability of this system.

OPERATION

The operation of the system will be best understood by reference to FIG. 1 in the drawing. In normal operation of the reactor, the isolation valves 22 and 24 would be open and valves 31 and 33 would be closed. In case of failure in the main coolant system whereby a stopage in the flow of coolant in the main coolant flow pipes 18 and 20 occurs, the system according to the invention will be activated. The failure may be, for example, a break in the main coolant pipes 18 and 20. Failure of the main coolant system is detected by a pressure sensor (not shown) which closes the valves 22 and 24 and opens the valves 31, 33 and 58. The operation of the valves completes the fluid circulation conduit. Thereafter heat generated in the reactor core 14 is communicated through the fluid circulation pipe 12 to the steam generator 36. Where desirable, the steam generator 36 may be maintained near operating temperatures by any conventional heating system.

The opening of control valve 58 permits steam in the steam dome 47 to be delivered via propellant steam conduit 56 to the jet circulator 32. Jet circulator 32 provides a high flow rate of coolant fluid (steam) into the reactor vessel 12 in the direction of the arrows, and forces the coolant fluid through the core 14, thereby removing heat from the core, and raising the temperature of the coolant fluid. The heated coolant fluid returns to the heat transfer vessel 30 and impinges on the vaporizer 36. Vaporizer 36 removes sufficient heat from the coolant fluid to generate steam in the steam dome 47 for the continued operation of the jet circulator 32. The economizer 38 removes an additional quantity of heat to improve the efficiency of steam generation in vaporizer

36. The heat removed by the vaporizer 36 and economizer 38 is substantially completely returned to the coolant fluid at the jet circulator 32 so that the actual heat rejection from the system takes place primarily at the heat rejection means 40.

Since the jet circulator 32 produces a pressure differential substantially immediately upon activation of the system, and since the pressure pertubation generated in the jet circulator 32 is transmitted throughout the system at sonic velocity, the steam already in the system from the vaporization of water originally flowing in the main coolant system, is quickly forced into circulation through the fluid circulation conduit so that cooling action commences very quickly.

If for any reason the pressure in the system exceeds the release setting of the safety valve 54, the valve 54 will release sufficient steam from the system to maintain pressure equilibrium. The steam is released through valve 54 into the secondary containment building in which the nuclear reactor is housed. Since the building has a substantial volume, it acts as a heat sink for a sufficient period of time to start up auxiliary heat rejection means, such as by bringing on-line auxiliary cooling water pumps in the cooling water system 60 to maintain circulation through the heat rejection means 40.

The flow restrictors 27 and 29 act as pressure retaining means to insure that a pressure equilibrium will be developed in the system even in the case of a break in the sections 26 and 28 of the main coolant pipes 18 and 20. The system possesses a high operational stability without external control especially when utilized in parallel with heat dissipation systems in the other cooling loops of a reactor. The overall system stability is enhanced by the ability of the remaining heat dissipation systems to automatically take over the load caused by the failure of a single heat dissipation system.

Having described my invention, I now claim:

1. A heat dissipation system comprising:
    a contained source of heat,
    a fluid circulation conduit for circulation of fluid to and from said contained source of heat,
    coolant fluid in said fluid circulation conduit consisting of a gaseous two-component mixture, one component being a condensable vapor at the conditions prevailing in the system,
    a jet circulator means in said fluid circulation conduit having a coolant fluid inlet and a coolant fluid outlet and having a motive fluid inlet,
    a vaporizer means in said fluid circulation conduit, containing a coolant fluid flow path with a coolant fluid inlet and outlet and a feed water flow path having a water inlet and a vapor outlet for extracting heat from said coolant fluid and thereby converting a condensed fraction of said coolant fluid in said feed water flow path into vapor,
    the coolant fluid outlet of the heat source being connected to the coolant fluid inlet of said vaporizer,
    said vapor having a pressure greater than the pressure of said coolant fluid in said fluid circulation conduit,
    the vapor outlet of said vaporizer means is connected to said motive fluid inlet of said jet circulator means,
    the coolant fluid outlet of said vaporizer is connected to said coolant fluid inlet of said jet circulator means,
    said coolant fluid outlet of said jet circulator means is connected to the coolant fluid inlet of the heat source,
    heat rejection means in said fluid circulation conduit downstream of said vaporizer means but upstream of the heat source for removing heat from said coolant fluid and partially condensing said condensible vapors into a condensed fraction of said coolant fluid,
    means incorporated in said heat rejection means for separating the condensed fraction from the remaining coolant fluid,
    and condensate delivery means for collecting said condensed and separated coolant fluid fraction and delivering it to the inlet of the feed water flow path of said vaporizer means.

2. A heat dissipation system according to claim 1 wherein:
    said contained source of heat is a reactor core in a pressure vessel,
    said pressure vessel having a main cooling circuit including main cooling piping,
    isolation valve means for disconnecting said pressure vessel from said main cooling circuit and connecting said pressure vessel to said fluid circulation conduit through a portion of said main cooling piping.

3. A heat dissipation system according to claim 1, wherein:
    said jet circulator comprises a high velocity flow nozzle in said motive fluid inlet,
    a turbulent mixing chamber, and
    a diffuser means for increasing the pressure of said coolant fluid.

4. A heat dissipation system according to claim 1, wherein:
    said condensible vapor comprises water-water vapor.

5. A heat dissipation system according to claim 1, wherein:
    the output of said jet circulator is upstream in said fluid circulation conduit from said heat rejection means.

* * * * *